United States Patent [19]

Ackley

[11] 3,785,047

[45] Jan. 15, 1974

[54] METHOD OF MANUFACTURING MAGNETIC READ-WRITE HEADS

[75] Inventor: Donald M. Ackley, Torrance, Calif.

[73] Assignee: Computer Communications, Inc., Culver City, Calif.

[22] Filed: Oct. 27, 1970

[21] Appl. No.: 84,383

[52] U.S. Cl. .......... 29/603, 179/100.2 C

[51] Int. Cl. .......... G11b 5/42, H01f 7/06

[58] Field of Search .......... 29/603; 179/100.2 C; 346/74 MC; 340/174.1 F

[56] References Cited

UNITED STATES PATENTS

| | | | |
|---|---|---|---|
| 3,302,268 | 2/1967 | Duinker | 29/603 |
| 3,605,259 | 9/1971 | Tawara et al. | 29/603 |
| 3,624,897 | 12/1971 | Reade et al. | 29/603 |
| 3,094,772 | 6/1963 | Duinker | 29/603 |
| 3,505,041 | 4/1970 | Bronnes et al. | 29/603 X |
| 3,187,411 | 6/1965 | Duinker et al. | 29/603 |
| 3,246,384 | 4/1966 | Vice | 29/603 |
| 3,577,634 | 5/1971 | Secrist | 29/603 |
| 3,411,202 | 11/1968 | Schwartz | 29/603 |

*Primary Examiner*—Richard J. Herbst
*Assistant Examiner*—Carl E. Hall
*Attorney*—Sokolski and Wohlgemuth

[57] ABSTRACT

A magnetic head has a thin magnetic gap in which there is a highly conductive non-magnetic material which is deposited on the gap face portion of at least one of the two magnetic pole pieces of the head. This head is fabricated by depositing thin conductive layers of equal thickness on spaced surface portions of one of the pole pieces and by joining together the two pole piece members to form an integral unit, with the deposited conductive layer portions of one pole piece abutting against opposed parallel flat surfaces of the mating pole piece so as to form a thin uniform magnetic gap therebetween. The unit is then cut crosswise to provide an open ended arm portion over which a prewound coil is placed, and finally a wide gap which appears opposite the narrow gap is bridged with a magnetic member to complete the magnetic circuit.

4 Claims, 8 Drawing Figures

PATENTED JAN 15 1974 3,785,047

Figure 1:
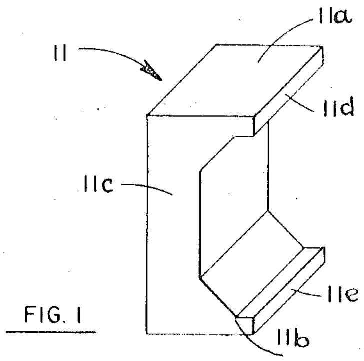

INVENTOR
DONALD M. ACKLEY
BY
SOKOLSKI & WOHLGEMUTH
ATTORNEYS

METHOD OF MANUFACTURING MAGNETIC READ-WRITE HEADS

This invention relates to magnetic read-write heads and more particularly to such a head having a uniform thin magnetic gap formed by a highly conductive material sandwiched between a pair of pole faces, and a method for fabricating a head of this type.

Magnetic read and write heads are used extensively in digital computers for writing digital or analog information into a storage medium such as a magnetic drum, disc or tape and for reading such information out of such media. It is highly desirable to have a very thin or narrow uniform magnetic gap in such heads to enable high recording densities, thus allowing an increase in the storage capacity of the storage medium. A further advantage of a thin or narrow magnetic gap is that it enables higher recording resolution. It is important, to assure accuracy of recording, that the magnetic gap be uniform. It is also important that the gap characteristics be readily reproducible so that all heads utilized with the same equipment have the same read and write characteristics.

Prior art efforts to fabricate magnetic heads have involved the manual or physical placement of a thin strip of conductive non-magnetic material placed between a pair of pole pieces which are then joined together, the conductive strip occupying the magnetic gap. Utilizing a conductive material in the magnetic gap increases the reluctance in such gap by virtue of the eddy currents developed on the conductive material, thereby increasing both the magnetic output and sensitivity of the head. This prior art technique, however, has shortcomings. Firstly, it is difficult to maintain gap uniformity due to problems in obtaining strip material of precision uniform thickness and of maintaining this precision thickness in installation. Secondly, it is difficult to obtain and handle strip material for forming extremely narrow or thin gaps (of the order of 10–100 microinches).

Other techniques of the prior art for obtaining thin magnetic gaps involve the use of precision shims in temporary holding fixtures which are used to establish the gap spacing between the pair of pole pieces, with a melted glass frit being used to fill the gap so established, to maintain the spacing. While with this technique it has been possible to establish fairly narrow or thin gaps, it is still difficult to achieve as thin a gap as is possible with the technique of the present invention. Further, this prior art technique does not provide a conductive material in the gap and thus has much lower sensitivity than would be desired. Further, with this prior art technique, there are some limitations as to precision due to the reliance on shim elements utilized in the core spacing fixtures which can change in their dimensions with wear and extraneous effects such as warpage etc.

Also, with many techniques of the prior art, the magnetic coil must be wound on the core after the unit has been completed and the magnetic circuit is closed. This provides certain mechanical winding problems.

The device and technique of this invention overcomes the shortcomings of the prior art by enabling the fabrication of a magnetic head with a precision magnetic gap formed of conductive material of extremely narrow or thin proportions. This end result is achieved by depositing a thin conductive layer on surfaces of one of the pole face portions forming the head in such a manner as to provide precise uniform gap dimensions on a readily reproducible basis. The technique of this invention further permits the placement of a prewound magnetic coil on an arm of the head without any need for winding this coil around a closed arm portion thereof.

It is therefore the principal object of this invention to provide an improved magnetic head and a technique for its manufacture, having high resolution, a high density recording and readout capability, and which can readily be manufactured on a reproducible basis.

Figure 5:
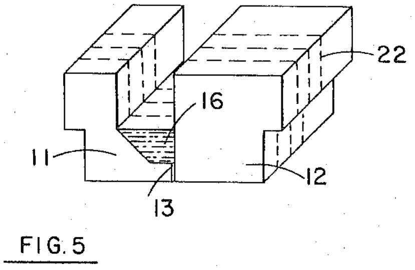
Figure 6:
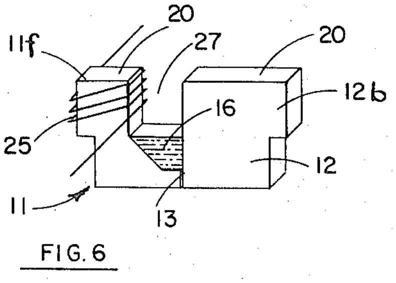
Figure 7:
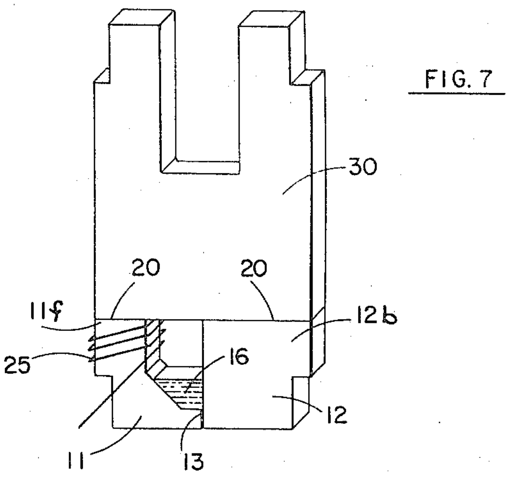

Other objects of this invention will become apparent as the description proceeds in connection with the accompanying drawings of which:

FIGS. 1–6 are a series of drawings illustrating the fabrication of preferred embodiments of the device of the invention, and FIG. 7 is a perspective view illustrating an embodiment of the invention as fabricated by the steps illustrated in FIGS. 1–6.

Briefly described, the device of the invention comprises a pair of pole piece members which are joined together along opposing surfaces thereof. At least one of the joined surfaces has a highly conductive material deposited thereon to form a magnetic gap between the two pole piece members, this gap appearing between adjacent pole faces of the two members. The pole piece members are formed so that when they are joined together and cut crosswise, a relatively wide gap appears between arm portions thereof which extend away from the magnetic gap to permit a magnetic coil to be placed on one of these arm portions. A magnetic bridging member is joined to the end surfaces of the pole piece arms to bridge this magnetic gap and complete the magnetic loop.

The technique of the invention by which the device just described is fabricated involves the deposition of non-magnetic highly conductive material in a uniform thin layer on either one entire surface of one of the pole pieces or on spaced portions of this surface. This pole piece is then joined to another pole piece, the surface portions having the deposition material thereon abutting against surface portions of the other pole piece, the deposition layer thus providing a uniform spacing between the two pole pieces. The unit thus formed is then cut crosswise to form two similar units which may subsequently be sliced into segments to form a plurality of magnetic pole piece units each suitable for use in a separate magnetic head. These pole piece units have a narrow magnetic gap along one surface thereof and a wide magnetic gap formed by two arm elements which appears opposite the narrow magnetic gap. A pre-wound magnetic coil is placed on one of the arm elements and finally the wide magnetic gap is bridged by joining a magnetic member to the ends of the arm element to complete the magnetic circuit.

Figure 2A:
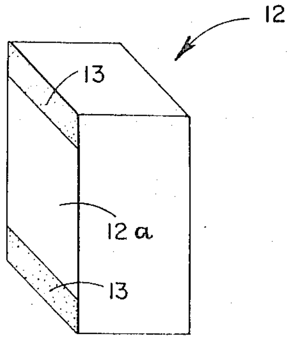
Figure 2B:
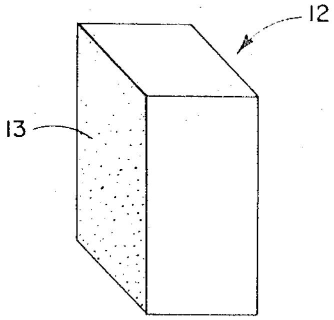

Referring now to the drawings, the fabrication of a preferred embodiment thereof is illustrated. A first magnetic pole piece member 11 has a central portion 11*c* with a pair of arm portions 11*a* and 11*b* extending therefrom to form a bifurcated structure. Arm portions 11*a* and 11*b* have flat end surface portions 11*d* and 11*e* respectively. A second pole piece member 12, which as pole piece 11 is fabricated of a highly magnetic material, has a flat surface 12*a*. Deposited in strips running along the opposite edge portions of surface 12*a* are thin layers 13 of a highly conductive non-magnetic material such as non-magnetic stainless steel, non-magnetic nickel, copper etc. Layers 13 are deposited to a uniform thickness, which may be of the order of 10–100 micro inches, by techniques well known in the art. The width of the deposited strips shown in FIG. 2*a* is preferably somewhat greater than that of surfaces 11*d* and 11*e*. In lieu of depositing the layers 13 in strips as shown in FIG. 2*a*, this layer may be deposited over the entire surface 12a as illustrated in FIG. 2*b*, or on the surfaces 11*d* and 11*e*.

Figure 3:
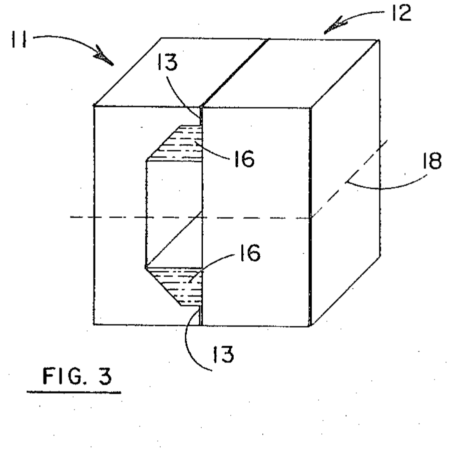
Figure 4:
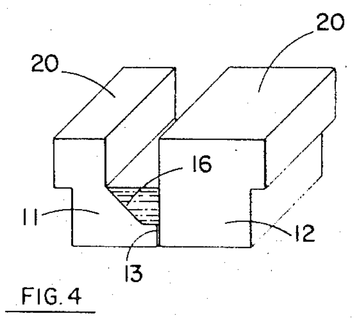

Pole pieces 11 and 12, which have similar heights and widths, are then joined together as shown in FIG. 3 with surfaces 11*d* and 11*e* abutting against deposited surfaces 13 of pole piece 12, the surfaces 13 providing a uniform spacing between the magnetic material of the two pole pieces. Joinder between the two pole pieces may be achieved by means of a bonding agent such as melted glass or ceramic material 16 which has a low coefficient of expansion and which is humidity resistant, which is poured into the pole piece regions adjacent to the area of abutment therebetween. The unit shown in FIG. 3 is then cut crosswise substantially along the center thereof, as indicated by line 18, to form two similar units as illustrated in FIG. 4. The top surfaces 20 of each such unit are lapped to provide flat surfaces for mating joinder with the magnetic bridging element, 30 (as shown in FIG. 7).

The unit of FIG. 4 is then sliced into thin segments as indicated by the dotted lines 22 in FIG. 5, to form a plurality of separate magnetic units having arm elements 11*f* and 12*b* with a wide magnetic gap 27 formed therebetween as illustrated in FIG. 6. A pre-wound coil 25 is then placed over arm element 12*f*. Finally, magnetic member 30 which has substantially the same thickness as that of the pole piece assembly and substantially the same width thereof is joined to the magnetic pole piece assembly as indicated in FIG. 7 with the end surfaces thereof abutting against surfaces 20 of the pole piece assembly, so as to bridge the magnetic gap and complete the magnetic circuit.

Thus, the final unit as illustrated in FIG. 7 has an extremely narrow magnetic gap formed between pole pieces 11 and 12, this gap having precise uniformity over its entire extent and having highly conductive material 13 therein to provide high sensitivity for the magnetic head. By virtue of the deposition technique utilized, a very narrow gap can be implemented for high density recording and high resolution which is readily reproducible and which has uniform thickness. Further, by fabricating the unit so that magnetic coil 25 can be installed after the pole pieces have been joined together and over an open arm element enables the prewinding of the coils, greatly facilitating the assembly process.

The method of this invention thus provides a relatively simple yet highly effective technique for fabricating a highly sensitive magnetic head having high resolution and recording density capability.

While the method and apparatus of this invention have been described and illustrated in detail, it is to be clearly understood that this is intended by way of illustration and example only and is not to be taken by way of limitation, the spirit and scope of this invention being limited only by the terms of the following claims.

I claim:

1. A method for fabricating a magnetic head comprising the steps of:

depositing a thin layer of conductive but non-magnetic material of a precise uniform thickness on flat surface portions of a first pole piece member, said layer being deposited on at least portions of said surface located at a significant distance from each other, joining a second pole piece member to said first pole piece member by means of a non-conductive bonding agent with flat surface portions of said second pole piece member in abutment against said deposited layer portions, said layers establishing uniform magnetic gaps between the opposing surfaces of said two pole piece members, the joinder being achieved by pouring a frit of glass or ceramic into the portions of said members immediately adjacent to said magnetic gaps and melting the frit, one of said pole piece members having arm portions which terminate in the face portions forming the magnetic gaps, cutting the joined uit crosswise to form at least one magnetic pole piece assembly having a wide gap portion on one end thereof formed by a pair of arm elements extending towards said one end, placing a prewound coil over one of the arm elements on said one end of said magnetic pole piece assembly, and bridging the wide gap portion with a magnetic member to complete the magnetic circuit.

2. The method of claim 1 wherein the non-magnetic material is deposited uniformly over the entire surface of the first magnetic pole piece member.

3. The method of claim 1 wherein the highly conductive non-magnetic material is deposited uniformly in strips on the surface of said first pole piece member, said strips being spaced from each other.

4. The method of claim 1 wherein said pole piece assembly is sliced prior to the placement of a coil thereon to form a plurality of separate thin pole piece units.

* * * * *